G. KAVANAGH.
PNEUMATIC TIRE.
APPLICATION FILED JAN. 29, 1912.
1,051,738.
Patented Jan. 28, 1913.
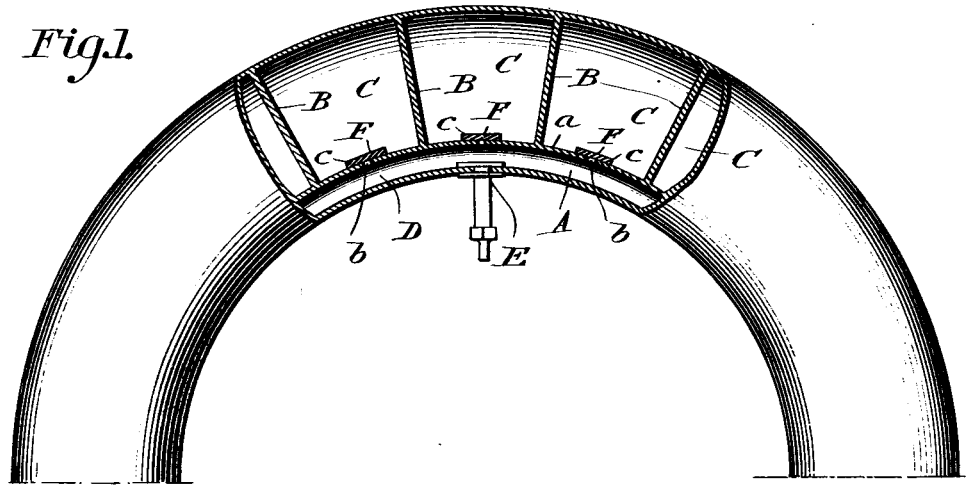
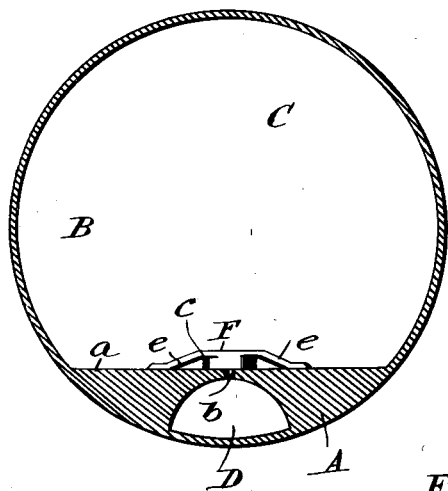
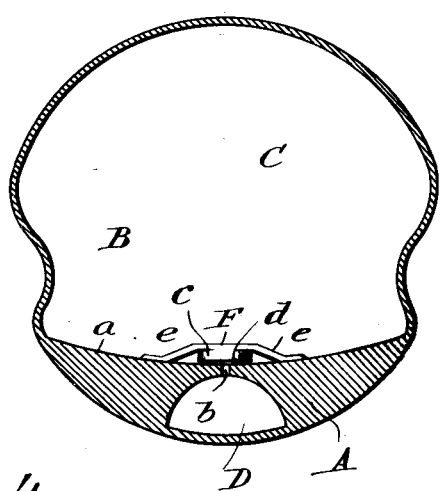
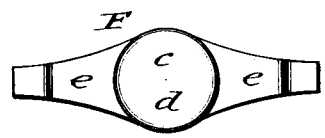
WITNESSES
INVENTOR
Garrett Kavanagh,
by
James P. Sheehy & Co. Attorneys

UNITED STATES PATENT OFFICE.

GARRETT KAVANAGH, OF ST. JOHN'S, NEWFOUNDLAND.

PNEUMATIC TIRE.

1,051,738. Specification of Letters Patent. Patented Jan. 28, 1913.

Application filed January 29, 1912. Serial No. 674,164.

*To all whom it may concern:*

Be it known that I, GARRETT KAVANAGH, a citizen of the Colony of Newfoundland, residing at St. John's, in the Colony of Newfoundland, have invented new and useful Improvements in Pneumatic Tires, of which the following is a specification.

My present invention pertains to pneumatic tires for the wheels of automobiles, bicycles and other vehicles, and more particularly to the type of tires that comprise a plurality of compartments adapted to be supplied with air under pressure from a common conduit, and equipped with non-return valves for normally isolating the compartments from the main conduit, this with a view to preventing the collapse of the entire tire when air escapes from one compartment through a puncture formed in the wall thereof.

The object of my invention is to provide a tire of the kind set forth, embodying a construction that is simple, durable and reliable, and is adapted when necessity demands to be so manipulated that any one or all of the compartments can be expeditiously and easily exhausted of air or deflated.

With the foregoing in mind the invention will be fully understood from the following description and claim when the same are read in connection with the drawings accompanying and forming part of this specification, in which:

Figure 1 is a view, partly in side elevation and partly in section of one-half of a tire constructed in accordance with my invention; it being understood that the half not shown is similar to the illustrated half. Fig. 2 is an enlarged transverse section taken through so much of the tire as is necessary to illustrate my invention. Fig. 3 is a similar view illustrative of the manner in which the inner thick portion of the tire is positioned with respect to the valve complementary to a particular compartment when it is desired to exhaust the air under pressure from said compartment. Fig. 4 is a detail view of one of the peculiar and advantageous non-return valves embraced in my invention.

Similar letters of reference designate corresponding parts in all of the views of the drawings.

My novel tire is formed of rubber or any other material or composition suitable for tire purposes, and consonant with the ends sought to be attained by the provision of the tire. The tire is peculiar in that it is provided with an inner thick and solid integral portion A, which is designed to be opposed to the rim of a wheel entirely around the same. The side of the tire portion A that is adjacent the interior of the tire, is flat, as indicated by $a$, and intermediate the said side $a$ which is flat or straight in the direction of the width of the tire, and the outer portion of the tire are arranged spaced transverse partitions B, Fig. 1. These partitions B are preferably integral with the portion A and the remainder of the tire, and serve to divide the interior of the tire into a plurality of compartments C. In the portion A of the tire is formed a main air conduit D which has at E a tube through which air under pressure may be supplied the tire from any suitable source of supply. Each of the compartments C is connected with the main air conduit D through a port or passage $b$ formed in the tire portion A, and in each compartment C is arranged a non-return valve F, constructed and arranged to permit air under pressure to pass from the conduit D into the compartment and to check the return of such air. The valves F are identical in construction and in arrangement relative to the tire portion A, and therefore a detailed description of the valve shown in Figs. 2, 3 and 4, will suffice to impart a definite understanding of all. The valve referred to comprises a hard body $c$, preferably of rubber, much larger in diameter than the port $b$, and having a flat side $d$ designed to bear solidly against the side $a$ of portion A, as shown in Fig. 2, and for the purpose stated, and pliable arms $e$, preferably of comparatively soft rubber, formed integral with or suitably attached in permanent manner to the back portion of the body $c$, and connected at their outer ends by adhesive or any other suitable means, to the side $a$ of the tire portion A. This construction of valve is obviously simple in construction and reliable in operation, and it is also advantageous because when it is desired to unlock any particular compartment C—*i. e.*, exhaust air under pressure from said compartment, it is simply necessary to press the tire at opposite sides of the main air conduit so as to bend the edges of the portion A outward and make the side *a* describe an arch, as shown in Fig. 3. The valve body *c* being hard and not pliable will not fill up or conform to the curvature of the arch, and at the same time the pliable arms *e* will cause the valve body to leave the end of the port *b* adjacent the compartment, whereupon the air confined in said compartment will pass to the main compartment D and from thence through the tube E to the atmosphere.

It will be seen by reference to Fig. 3 that the outward bending of the edges of the portion A may be conveniently accomplished by grasping said portion in one hand and squeezing it in the direction of its width; and it will also be seen that the hard body *c* of the valve and the flat side *d* on said body are essential to the opening of the port *b* since otherwise the portion containing the port *b* could not be flexed away from the valve body.

It will be manifest from the foregoing that when air under pressure is supplied through the tube E to the passage G, all of the compartments C will be lated; and it will also be manifest that incidental to the use of the tire, a puncture formed in the wall of any one compartment will be attended by deflation of that compartment alone, and hence the resiliency of the tire as a whole will not be materially affected, and the tire can be used for an indefinite period before the said puncture is plugged or otherwise closed.

Having described my invention, what I claim and desire to secure by Letters-Patent, is:

The combination with a pneumatic tire of resilient material having a thick and solid portion adapted to be opposed to the rim of a wheel, said thick and solid portion having, in turn, an inner side that is straight in the direction of the width of the tire, and also having a port formed in the longitudinal center of the thick and solid portion and a main air conduit also formed in said thick and solid portion and communicating with said port and extending at opposite sides of the longitudinal center of the tire; of a non-return valve arranged in the tire and consisting essentially of a hard body that has a flat side opposed to the flat side of the thick and solid portion, over the said port, and also having pliable arms that extend in opposite directions from the back portion of said hard body and at right angles to the length of the tire and are joined at their outer ends to the said flat side of the thick and solid portion, whereby when the inner side of the thick and solid portion is concaved by bending the edges of said portion outward the tire part containing the port will be flexed away from the flat side of the hard valve body.

In testimony whereof I have hereunto set my hand in presence of two subscribing witnesses.

GARRETT KAVANAGH.

Witnesses:
 THOMAS KELLY,
 ARTHUR R. BULLER.